US 008862691B2

(12) United States Patent
Aroner

(10) Patent No.: US 8,862,691 B2
(45) Date of Patent: Oct. 14, 2014

(54) MEDIA AGGREGATION AND PRESENTATION

(75) Inventor: Jonathan I. Aroner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 12/341,941

(22) Filed: Dec. 22, 2008

(65) Prior Publication Data

US 2010/0162172 A1    Jun. 24, 2010

(51) Int. Cl.
*G06F 15/16* (2006.01)
*G06F 17/30* (2006.01)

(52) U.S. Cl.
CPC .... *G06F 17/30029* (2013.01); *G06F 17/30058* (2013.01)
USPC ............ 709/217; 709/231; 709/227; 707/732

(58) Field of Classification Search
CPC ..................... G06F 17/30058; G06F 17/30029
USPC .................................. 709/231, 227; 707/732
See application file for complete search history.

(56) References Cited

U.S. PATENT DOCUMENTS

| 6,725,275 | B2 | 4/2004 | Eyal |
| 6,847,977 | B2 | 1/2005 | Abajian |
| 7,836,040 | B2 * | 11/2010 | Lee ............................... 707/706 |
| 2004/0002993 | A1 | 1/2004 | Toussaint et al. |
| 2004/0103303 | A1 | 5/2004 | Yamauchi et al. |
| 2005/0038819 | A1 * | 2/2005 | Hicken et al. .............. 707/104.1 |
| 2006/0161635 | A1 | 7/2006 | Lamkin et al. |
| 2007/0177632 | A1 | 8/2007 | Oz et al. |
| 2008/0034276 | A1 | 2/2008 | Ficco |
| 2008/0044016 | A1 | 2/2008 | Henzinger |
| 2008/0133376 | A1 * | 6/2008 | Hill ................................ 705/26 |
| 2008/0136937 | A1 * | 6/2008 | Murakoshi ................. 348/231.2 |
| 2009/0138502 | A1 * | 5/2009 | Kalaboukis et al. ........ 707/104.1 |
| 2009/0164419 | A1 * | 6/2009 | Taylor et al. ...................... 707/3 |
| 2010/0070523 | A1 * | 3/2010 | Delgo et al. .................. 707/769 |
| 2010/0094863 | A1 * | 4/2010 | Kenton-Dau et al. ......... 707/722 |
| 2010/0138517 | A1 * | 6/2010 | De Los Reyes et al. ...... 709/218 |

OTHER PUBLICATIONS

Artur Lugmayr, Ambient Media, UPGRADE, Aug. 2007, pp. 38-43, vol. VIII, No. 4, CEPIS, http://www.upgrade-cepis.org/issues/2007/4/up8-4Lugmayr.pdf.

* cited by examiner

*Primary Examiner* — Bryan Lee
(74) *Attorney, Agent, or Firm* — Micah Goldsmith; Peter Taylor; Micky Minhas

(57) ABSTRACT

A system and methods for aggregating content, displaying the aggregated content to a user for selection, and if more than one of the same file is detected, determining which file to play back to the user. When a request to view a certain type of content is received from the user, personal content themes are identified based on content stored on the user's local network. Remote content providers are searched for content relevant to the personal content themes. The relevant content is displayed to the user based on a total relevance score. The user selects a piece of content displayed in the interface. If more than one media file for the selected piece of content is identified, the optimal media file is selected and played back to the user.

15 Claims, 11 Drawing Sheets

MEDIA AGGREGATION AND PRESENTATION

BACKGROUND

Digital media devices such as network-connected television sets and digital media adapters (DMAs) are evolving to provide consumers with access to an increasing large amount of digital media. Digital media includes content (e.g., television episodes, movies, music, images, etc.) available from remote content providers (e.g., YouTube, ABC.com, NBC.com, Netflix, etc.) as well as content stored on a user's local network (e.g., desktop computer, laptop computer, digital video recorder, digital media device, portable music player, etc.). With access to potentially thousands of pieces of media content coming from a variety of sources, network-connected televisions and digital media adapters attempt to provide search tools to allow the user to quickly find specific content to consume.

Many existing digital media devices display the available media content to the user in unhelpful ways, such as alphabetically ordered thumbnail images. Many digital media devices also do little to ensure that the highest quality media file is played to the user when identical pieces of content are located on multiple remote sources (e.g., two different Internet services). These problems present considerable usability problems for the user.

SUMMARY

One aspect of the present technology is to improve the playback experience for a user requesting to view media content. A user selects to view a particular type of content (e.g., television). Media content is aggregated based on the user's viewing habits. The user's viewing habits are determined by identifying media files stored on the user's local network, and determining personal content themes based on meta-data associated with each media file. The system identifies relevant media files based on the personal content themes, and calculates a relevance score for each media file. A gallery of thumbnail images is provided to the user based on the total relevance score. By arranging the thumbnail images in the gallery by relevance score, the content that is likely to be of most interest to the user can be displayed in the most prominent area of the gallery.

One aspect of the present technology is to maximize advertising revenue for the content provider (e.g., television network, music label, etc.), content aggregator (e.g., Netflix, etc.) and/or service aggregator (e.g., Microsoft, etc.). By arranging thumbnail images in a particular order, the system encourages a user to select thumbnail images that will generate higher advertising revenue for the content provider, content aggregator and/or service aggregator. A total relevance value is calculated for each media file located on a remote network. One component of the total relevance value is how much advertising revenue will be generated, if any at all. The media files are prioritized based on the total relevance value. The location of thumbnail images associated with the media files are displayed to the user in a media gallery based on the total relevance value.

One aspect of the present technology is to determine if more than one media file associated with the same piece of content is available for playback to the user, and if there is, chose one of the media files without requiring user input. A media gallery is displayed to the user, which allows a user to select a thumbnail image and view the content associated with the thumbnail image. Once the user selects a thumbnail image, the system detects if more than one media file exists for the piece of content selected by the user (e.g., a specific television episode). If more than one media file is detected, the system determines which media file to play back to the user. To do so, the attributes associated with each media file (e.g., quality, bit rate, network connection, etc.) are compared and an optimal media file is selected to play back to the user via an interface.

DETAILED DESCRIPTION

The technology described herein provides a digital media device that aggregates and displays media content for selection by a user. The media content is displayed in a user interface in a media-specific gallery format. The location of each piece of media content within the gallery format is influenced by the content's relevance to the user's personal content themes and advertising revenue that may be realized by the provider of the digital media device. To view a piece of content, a user selects a thumbnail image of the content displayed in the user interface. The digital media device contains duplicate handling heuristics to determine which copy of the selected content should be played back to the user if the device detects that more than one copy of the selected content exists.

Figure 1:
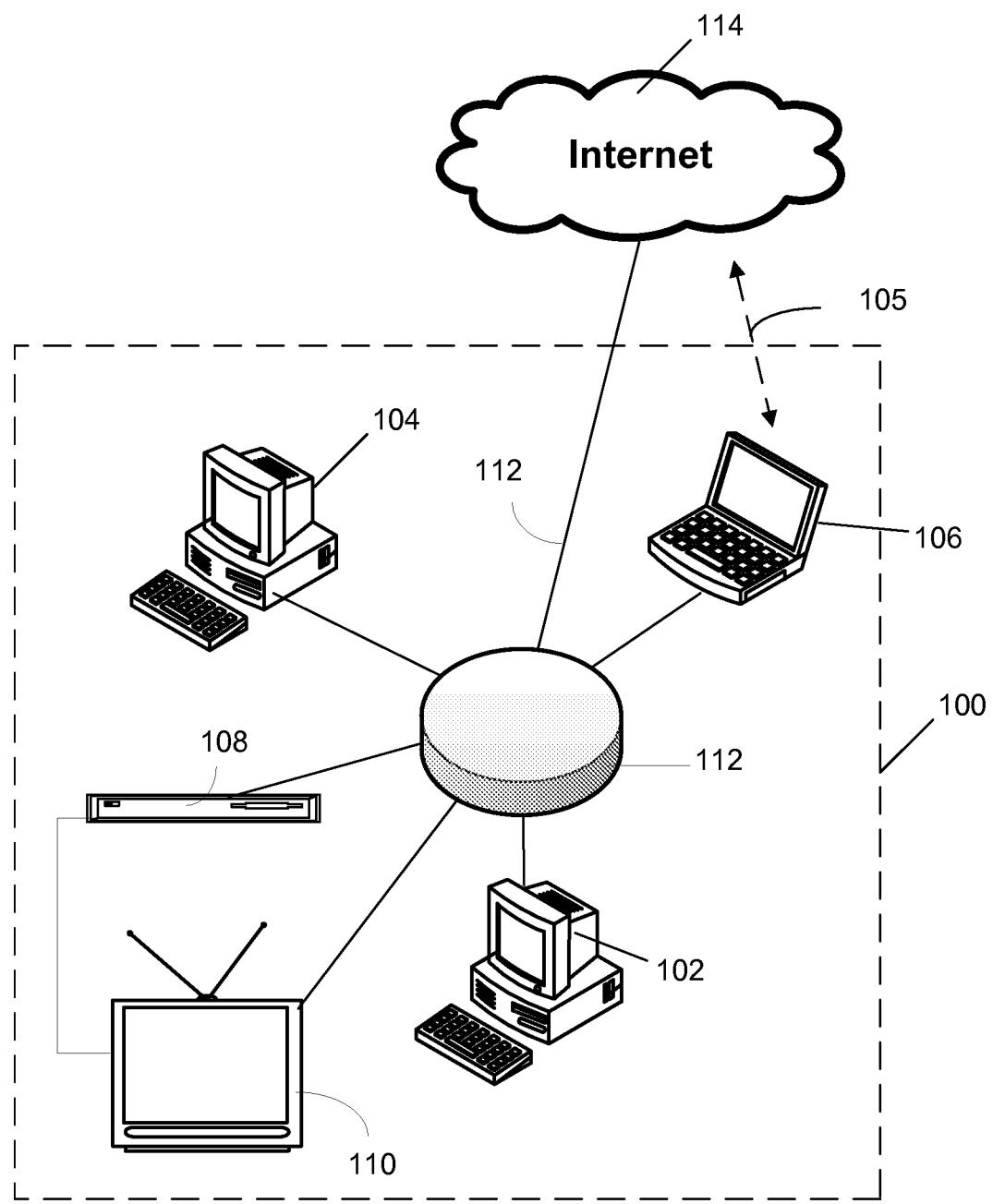
FIG. 1 depicts an exemplary media system according to the present technology.

The present technology will now be described in reference to FIGS. 1-13. FIG. 1 illustrates an exemplary home network 100 suitable for aggregating content obtained from a wide area network (WAN) 114 and a local area network (LAN) 112, and presenting the content to a user via a user interface in a gallery format. The home network 100 includes several hardware devices, including a first personal computer (PC) 102, a second PC 104, a laptop computer 106, a digital media adapter (DMA) 108 and a television 110. Each of these hardware components communicate with each other via the LAN 112, which is in communication with the Internet 114 (also referred to as a WAN).

FIG. 1 illustrates that each hardware device communicates with each other over a wired LAN 112. It is within the scope of the present technology for one or more of the hardware devices to communicate with each other over a wireless LAN 112. For example, the first PC 102 may communicate with the second PC 104 via a wireless network. FIG. 1 illustrates that the laptop computer 106 communicates with the WAN 114 via a wireless connection 105 and the LAN 112 over a wireless connection 107. The laptop computer 106 may also communicate with the LAN 112 and/or WAN 114 via a wired connection. The environment 100 is not limited to the network shown in FIG. 1, and may include other hardware devices.

A user may store media content on one or more of the hardware devices, and may store the same piece of content (e.g., a television episode) on more than one hardware device. By way of example only, a user may download a movie from a content provider via the WAN 114 and store the movie on the first PC 102, download a television episode from another content provider and store the episode on the laptop computer 106, and download music files from a music content provider and store the music files on the second PC 104. If the user forgot that he already downloaded the television episode and stored it on the laptop computer 106, the user may download the television episode a second time, but end up storing the episode on, for example, the first PC 102. In this instance, two copies of the same television episode are stored on the home network 100. The same would be true if the user copied a piece of content to another device in the home network (e.g., second PC, etc.). However, the two media files are located on different hardware devices and may have been downloaded from two different content providers. The same is true for a movie, music file, photograph, and the like.

The methods described below may be performed or executed by several different devices, including, but not limited to, the DMA 108, the television 110, a set-top box, and the like. For purposes of describing the technology herein only, the technology described herein resides on the DMA 108. Using the home network 100 shown in FIG. 1, a user will be able to view LAN content and content available via the Internet 114 through the television 110.

Figure 2:
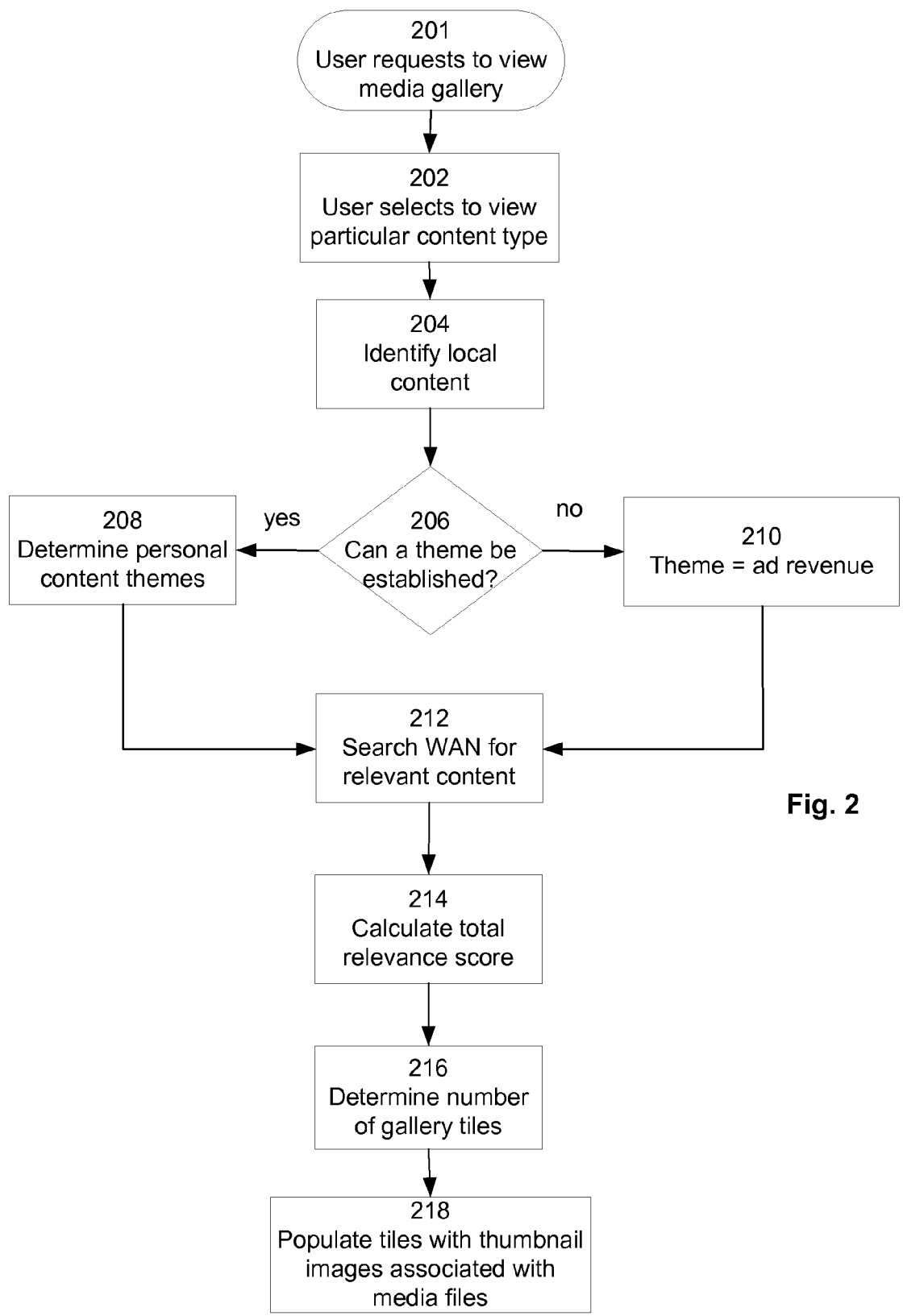
FIG. 2 depicts a flow diagram illustrating exemplary steps for populating a user interface with content.

FIG. 2 illustrates exemplary steps for displaying content available to a user. In step 201, the user requests to view a media gallery of available content. In one embodiment, the DMA 108 provides a user interface 1200 to the user with the following selections: Movies, Music, Television, Photos and Podcasts (see FIG. 12). Other interfaces may be presented to the user. In step 202, the user selects one of the media choices displayed in the user interface (e.g., via a remote control). For purposes of describing the technology herein only, the user, in step 202, selects the "Television" choice presented in the content menu 1202.

In step 204, the media content located on the home network 100 is identified. Here, because the user selected "Television" in step 202, the DMA 108 locates all media files stored on the home network 100 associated with a television episode, in step 204. A media file may comprise any video file (e.g., .wmv format, .ivs format, etc.), audio file (e.g., .mp3 format, .rmf format, etc.), and the like. As shown in FIG. 1, the home network 100 includes the hardware devices that can store media files: the first PC 102, the second PC 104, and the laptop computer 106. The DMA 108 locates all television media files stored on the first PC 102, the second PC 104, and the laptop computer 106. If other hardware devices were located on the home network 100, the DMA 108 would locate media files stored on them as well. If the user selected "Movies" in step 202, the DMA 108 would identify all movie files stored on all hardware devices located in the home network 100. Similarly, if the user selected "Music" in step 202, the DMA 108 would identify all music files stored on all hardware devices located in the user's home network 100.

In step 206, the DMA 108 determines if personal content themes can be established based on the media files located on the home network 100. Personal content themes indicate a user's television viewing habits (e.g., user likes to watch the television programs "House," "Dancing with the Stars" and "Simpsons") and may be determined by analyzing metrics such as ratings, play count, how recently a file was played, and the like. A personal content theme can be determined based solely on a single metric or may be determined based on a combination of metrics. If at least one media file is identified in step 204, it is likely that a personal content theme can be established. The DMA 108 may continually update a user's viewing habits based on selections made by the user in the gallery 1200. If no media files are identified in step 204, the DMA 108 designates advertising revenue as a personal content theme, in step 210.

In step 208, personal content themes are determined. Methods exist today for determining personal content themes. By way of example only, the DMA 108 obtains metrics from the media files identified in step 204. Television metrics may include, but are not limited to, metadata indicating content length (e.g., 30 minute episode), quality (high definition, standard definition, etc.), content provider (e.g., network, website, etc.), and type of program (e.g., reality program, news, sports, actor/actress in the program, etc.). As will be discussed in more detail later, a user may chose to view content located on a remote network (step 502 in FIG. 5). Once the user begins viewing content obtained from the WAN, the metrics associated with the selected content may also be used to determine personal content themes.

In step 212, the DMA 108 searches the WAN 114 for media files associated with television episodes that may be of interest to the user. The search is based on the personal content themes determined in step 208. Thus, the DMA 108 searches the WAN 114 for media files associated with television episodes that contain meta-data matching one or more of the personal content themes identified in step 208.

The DMA 108 searches various third-party content providers for media files associated with television episodes. As will be discussed in more detail later, the user may designate preferred content providers (see UIs in FIGS. 7 and 10). If the user has designated a preferred content provider, the DMA 108 will first search the preferred content provider for media files associated with television episodes. The DMA 108 will then continue to search other content providers for relevant media files.

As discussed above, the DMA 108 identifies every media file located on the WAN 114 that matches at least one personal content theme. For the purpose of describing this technology only, a media file is associated with a single television episode. However, a media file may also be associated with more than one television episode. And in the instance where the user requests to view other types of media in the gallery, a media file may be associated with a song, an album, a movie, a podcast and the like, and may comprise more than one song, album, etc. Not all media files identified by the DMA 108 are equally relevant or will be of equal interest to the user. Some of the media files identified by the DMA 108 will be highly relevant because the meta-data associated with the television episode matches all (or most) of the personal content themes. Another media file identified by the DMA 108 may be slightly less relevant because the meta-data associated with the television episode contain only a few of the personal content themes. The DMA 108 will also recognize that a media file is marginally relevant if the meta-data associated with the media file only contains one or two personal content themes.

In step 214, the DMA 108 calculates a total relevance score for each media file, and the media files are organized by this score. More detail about calculating the total relevance score is discussed later herein. In step 216, the DMA 108 determines how many thumbnail images to display in the user interface (e.g., UI 1000 in FIG. 10). A thumbnail image may be associated with each media file. In one embodiment, all television episodes identified on the WAN in step 212 will be displayed in the gallery user interface. Thus, a thumbnail image is generated in step 216 for every television episode identified in step 212. In an alternative embodiment, only a percentage of the television episodes are displayed in the user interface. This way, all of the highly relevant television episodes (of most interest to the user) are displayed in the user interface. At the same time, less relevant television episodes, but which may also be of interest to the user, are displayed in the user interface as well. Any combination of content identified in step 212 may be displayed in the user interface 1200. Alternatively, a single thumbnail image may be displayed for a television program (e.g., "House") and the user may select the thumbnail image to view available episodes.

In step 218, each tile in the user interface is populated with a thumbnail image. In one embodiment, each tile in the user interface is populated with a thumbnail image of a television episode identified on the user's home network 100 and television episodes identified on the WAN 114. In this scenario, the television episodes identified on the WAN 114 (step 212) may be displayed more prominently in the user interface than the television episodes from the user's home network 100. In an alternative embodiment, the tiles in the user interface are populated with only television episodes identified on the WAN 114 (step 212). In yet another embodiment, the tiles in the user interface are populated with television episodes identified only on the LAN 112. More detail about the organization of tiles within the user interface will be provided hereinafter.

Figure 3:
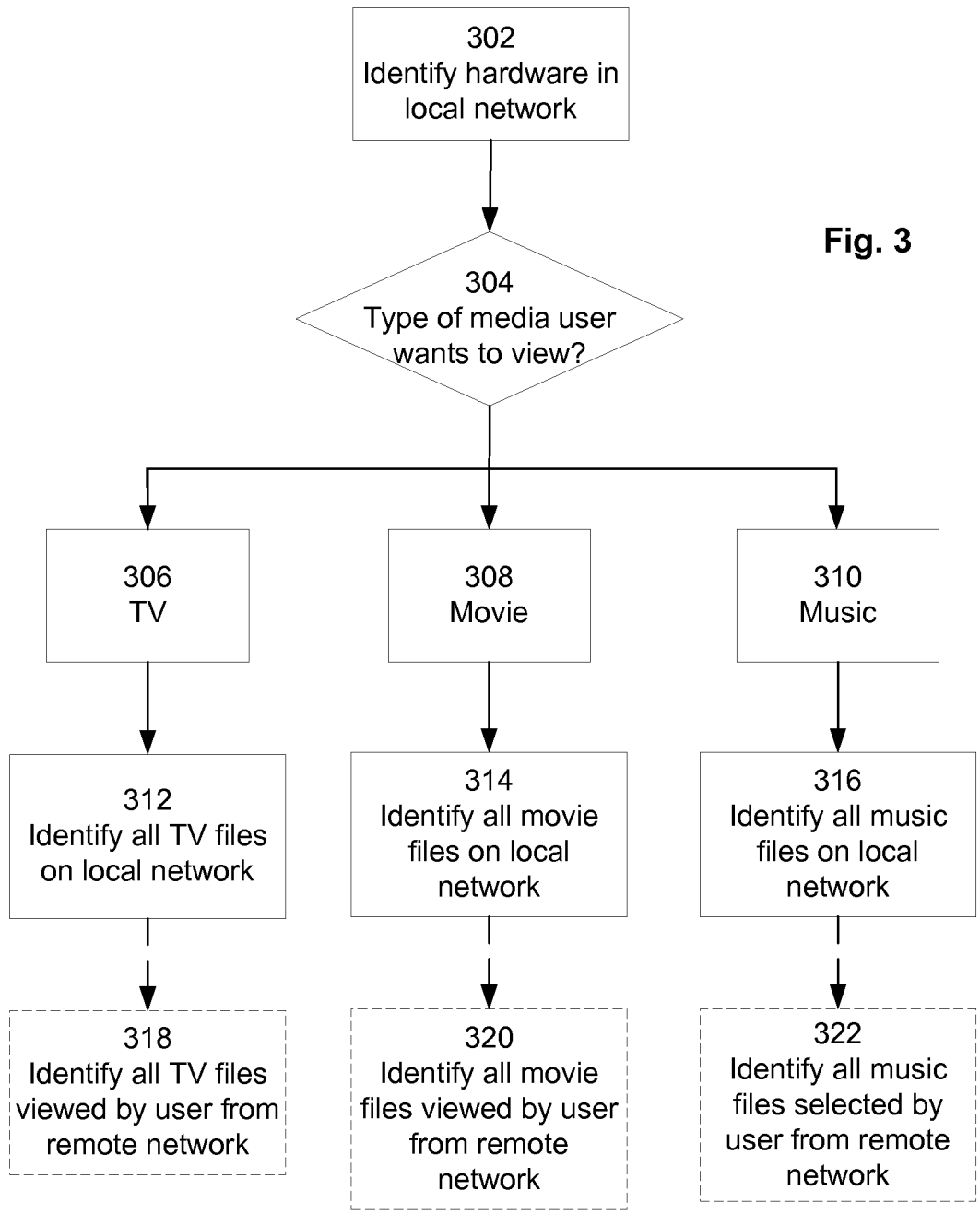
FIG. 3 depicts a flow diagram illustrating exemplary steps for optimizing how the user interface is populated with content.

FIG. 3 illustrates addition detail of step 204. FIG. 3 illustrates exemplary steps to identify television files, movie files and music files on the local network. However, similar steps may be used to identify image files, podcast files and the like. In step 302, the hardware devices in the home network 100 containing at least one media file are identified. Using the exemplary network shown in FIG. 1, the DMA 108 identifies the first PC 102, the second PC 104 and the laptop computer 106, in step 302. In step 304, the type of media requested by the user is identified. Here, the user requested to view available television content (306). In step 312, the DMA 108 identifies all television media files located on the first PC 102, the second PC 104 and the laptop 106. By way of example only, the DMA 108 is able to identify television media files located on the home network 100 by file extension or meta-data associated with the media file. If the user requested to view movie content (308), the DMA 108, in step 314, identifies all movie media files located on the first PC 102, the second PC 104 and the laptop 106. If the user requested to view music content (310), the DMA 108, in step 316, identifies all music media files located on the first PC 102, the second PC 104 and the laptop 106.

A user's viewing and listening habits continually change. FIG. 3 illustrates that personal content themes may also be influenced by choices the user previously selected of content located on the remote network (that was previously presented to the user in, for example, UI 1100 in FIG. 11). If the user selected TV in step 306, the DMA 108 also identifies metrics associated with all television episodes viewed by the user that were previously obtained from the remote network, in step 318. If the user selected movie in step 308, the DMA 108 also identifies metrics associated with all movies viewed by the user that were previously obtained from the remote network, in step 320. If the user selected music in step 310, the DMA 108 also identifies metrics associated with all music files selected by the user that were previously obtained from the remote network, in step 322. Using the content most recently selected by the user helps refine the personal content themes based on the latest interests of the user.

Figure 4:
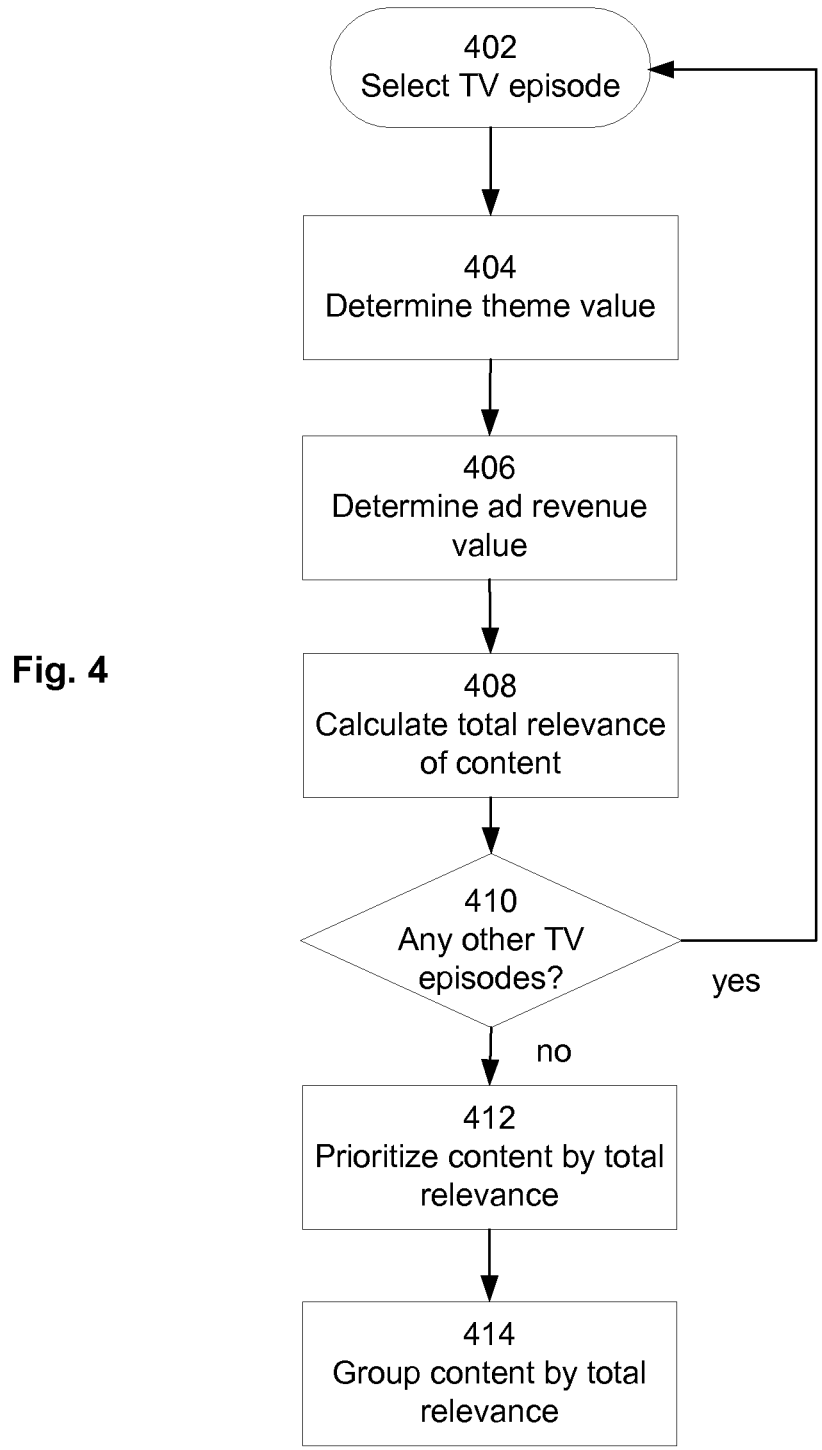
FIG. 4 depicts a flow diagram illustrating exemplary steps for identifying content located on a local network.

FIG. 4 provides additional detail of step 216 in FIG. 2. In step 402, one of the television episodes identified in step 212 is selected. In step 404, a theme value is determined. As will be discussed in more details later, a theme value data table 800 is referred to determine the theme value (see FIG. 8).

In step 406, an advertising revenue value is calculated. As will be described in more detail later, an advertising revenue value is determined by referring to an advertising revenue table 900 (shown in FIG. 9). It is well known that content providers often pay advertising revenue to third parties to advertise and play content from their site. In step 408, a total relevance (TR) score is calculated for each television episode. By way of example only, the total relevance score is calculated using the following equation (1):

$$TR = 0.6(\text{theme value}) + 0.4(\text{advertising revenue value}) \quad (1)$$

As shown by equation (1), the total relevance of a piece of content is a weighted calculation including the theme value and the advertising revenue value. The DMA 108 attempts to present content to the user that is the most relevant to the user's viewing habits (based on personal content themes). The theme value is weighted more heavily than the advertising revenue in equation (1) to place more emphasis on presenting content that matches a maximum number of personal content themes to the user. At the same time, the DMA 108 attempts to maximize the advertising revenue for the DMA provider. Including advertising revenue in equation (1), at some level, ensures that the highly relevant content that also generates advertising revenue for the DMA provider will be displayed prominently in the user interface. The coefficients associated with the theme value (e.g., 0.6) and the advertising revenue value (e.g., 0.4) are for exemplary purposes only, and may comprise any other value.

It is also within the scope of the technology to dynamically adjust the coefficients in equation (1) based on user behavior over time. For example, suppose a user frequently views television content via the user interface 1100, but has yet to select any one of the Group 2 thumbnails (some relevance/ high advertising revenue content, discussed below). In this case, the DMA 108 might interpret the user's actions as the user is not interested in viewing somewhat relevant content, and will weight the theme value portion of equation (1) more heavily in subsequent content searches. Or the DMA 108 may simply reduce the number of Group 2 thumbnails displayed in the user interface 1100 the next time the user interface 1200 is generated.

In step 410, the DMA 108 determines if any other television episodes were identified. If there were more episodes, the method returns to step 402 and repeats steps 404-408 for the next episode. If there are no more episodes, the method continues to step 412.

In step 412, the content identified in step 212 is prioritized by TR score. In step 414, the prioritized content is divided into predetermined groups. For example, the content may be divided into the following three groups: (1) high relevance/ high advertising revenue (also referred to as "Group 1"), (2)

some relevance/high advertising revenue (also referred to as "Group 2"), and (3) high relevance/low advertising revenue (also referred to as "Group 3"). The range of total relevance scores for each group of content may be, in one embodiment, determined by predetermined. For example, using the data tables shown in FIGS. 8-9 and the total relevance equation (1) shown above, it may be predetermined that only content with a TR score of 8.0 or higher will be placed into Group 1, content with a TR score between 6.2-7.9 will be placed into Group 2 and content with a TR score between 0.6-6.1 will be placed into Group 3.

Figure 5:
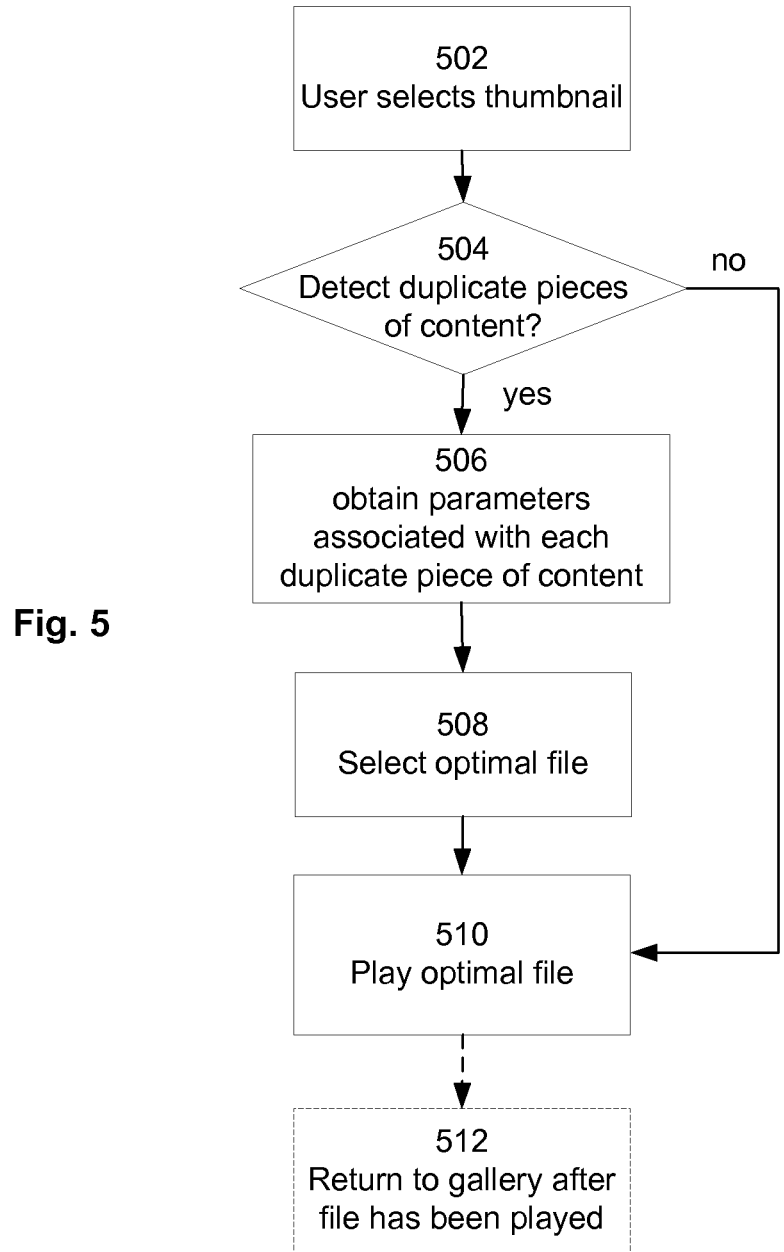
FIG. 5 depicts a flow diagram illustrating exemplary steps for playing content selected by a user.

Once the tiles in the user interface are populated with content (e.g., thumbnail images), the user may browse through the thumbnails and select a thumbnail to view a piece of content. FIG. 5 provides exemplary steps for playing content selected by the user. In step 502, a user selects a thumbnail image displayed in the user interface. The DMA 108, in step 212, may have located more than one media file associated with the selected content. For example, when the user selects a certain thumbnail to view a television episode of "Friends," the DMA 108 may have previously located a media file of the selected episode on both NBC.com and HULU. In step 504, the DMA 108 detects whether duplicate media files for the selected content exist. There are many ways that the DMA 108 can detect whether duplicate files exists. For example, the DMA 108 may identify that two media files exist with the same name, two files exist with an identical fingerprint, and the like. Video fingerprinting is a know technique in which sophisticated software identifies, extracts and then compresses characteristic components of a video, enabling that video to be immediately and uniquely identified by its resultant "fingerprint." If the DMA 108 cannot detect more than one copy of the content (step 504), the method continues to step 510, and the DMA 108 plays the content selected by the user. If more than one media file exists, the method continues to step 506.

In step 506, the parameters associated with each duplicate media file are obtained. By way of example only, the parameters that are collected in step 506 include file quality, bit rate, file location, network connection type, proximity, and the like.

In step 508, the DMA 108 selects the optimal media file. The optimal media file is the media file that will provide the highest quality playback experience for the user. In step 510, the optimal file (identified in step 508) is played back to the user. FIG. 5 illustrates that the user in step 410, the user is returned to the user interface, in step 512 after the episode has been viewed. Step 512 in FIG. 5 is shown as an optional step because, in an alternative embodiment, the user may instead be returned to the main menu of the user interface after the content has been played in step 510.

Figure 6:
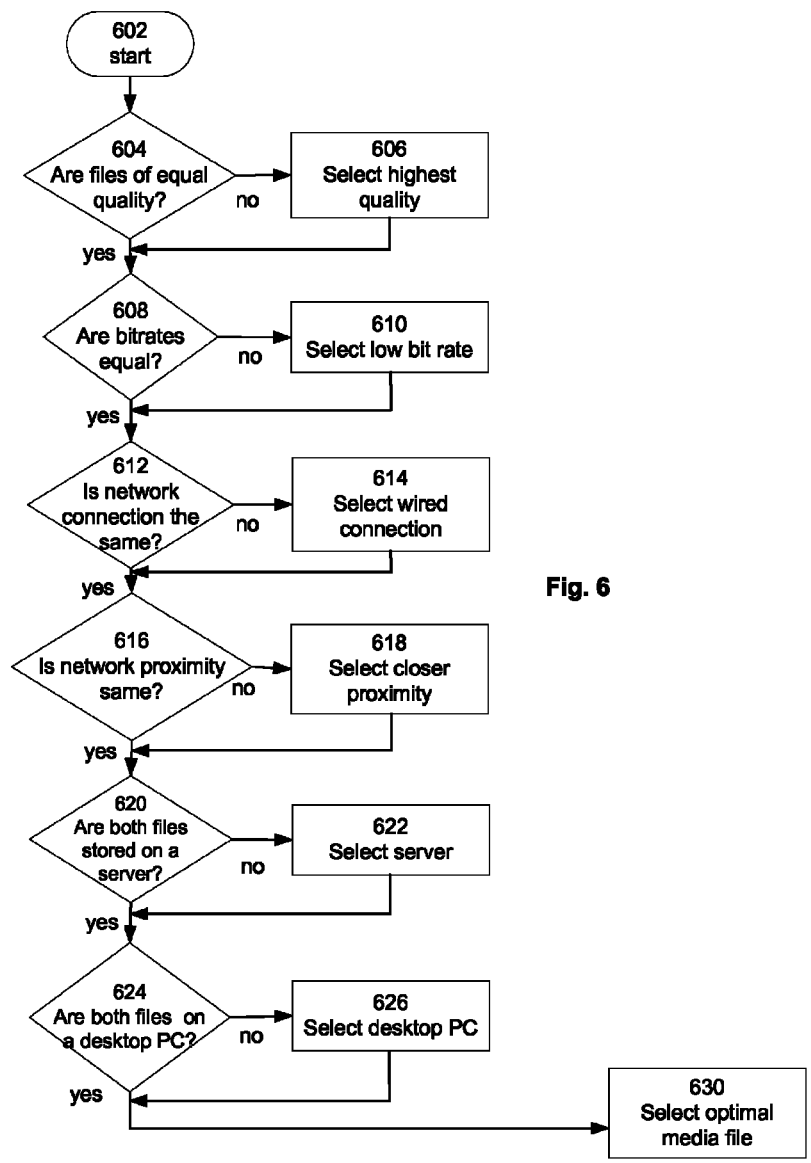
FIG. 6 depicts a flow diagram illustrating exemplary steps of selecting an optimal file for playback.

FIG. 6 illustrates exemplary steps for selecting the optimal file (step 508 in FIG. 5). The optimal file may be located either on the WAN 114 or the user's home network 100. In step 602, the selection process begins. For purposes of explaining the steps show in FIG. 6, the DMA 108 has detected two media files for the television episode selected by the user. The DMA 108 may, of course, detect any number of duplicate media files.

In general, steps 604, 608, 612, 616, 620 and 624 are executed to detect which of the duplicate media files is the optimal media file regardless of whether the media files are located on a WAN 114 or a home network 100. As will be discussed in more detail later herein, steps 620 and 624 are most applicable to selecting an optimal media file stored on a home network 100. The order of steps 604, 608, 612, 616, 620 and 624 is not limited to that shown in FIG. 6.

In step 604, the file quality (e.g., high definition, standard definition, etc.) of the two media files is compared. If the media files are of equal quality, the method continues to step 608. If, however, the two media files are not of equal quality, the higher quality media file is preferred. Thus, the higher quality media file is selected, in step 606. The method then returns to step 608.

In step 608, the bit rates associated with the two media files are compared against each other. If it is determined in step 608 that the bit rates of the two media files are not equal (e.g., one media file has a lower bit rate), the media file with the lower bit rate is preferred and selected, in step 610, and the method continues to step 612. If, however, the bit rates of the two media files are determined to be equal in step 608, the method continues to step 612.

In step 612, the network connection associated with the two media files is compared. For example, the user may have access to the WAN 114 via a wired connection and a wireless connection. It is generally known in the art that a wired connection is more reliable and faster than a wireless connection. If the network connection associated with the two media files is not the same (e.g., one wired and the other wireless), the media file associated with a wired connection is preferred, and is selected, in step 614. The method then continues to step 616. If, however, the network connections associated with the two media files are determined to be the same in step 612 (e.g., both connections are wired connections), the method continues to step 616. In the instance whereby media files from the user's home network 100 will be displayed in the user interface 1200, the DMA 108 will detect in step 612 if, for example, the network connection associated with a duplicate media file is via a laptop computer over a wireless network.

In step 616, the network proximity of each media file is compared. If the network proximity (e.g., proximity of the file location to the hardware device the media file will be played on) associated with the two media files is not the same, the media file associated with a closer proximity is preferred, and selected in step 618. The method then continues to step 620. If, however, the network proximity associated with each media file is determined to be the same in step 616, the method continues to step 620. For example, one duplicate file may be located on a personal computer located in the room adjacent the television (that will display UI 1200) while a second duplicate file may be located on a content aggregator's server located on the WAN 114. In this case, the DMA 108 would prefer to play the media files stored on the personal computer located in the adjacent room, assuming other file attributes are equal (e.g., quality, bit rate, etc.).

In step 620, it is determined whether each media file is located on a server. If only one media file is located on a server, the media file located on a server is preferred, and selected in step 622. The method would then continue to step 624. If, however, both media files are located on a server, the method continues to step 624. In step 624, it is determined whether both media files are located on a desktop personal computer. It is generally well known that a desktop PC is more reliable and powerful than a laptop computer. If only one of the two media files is stored on a desktop PC, it is selected in step 626, and the method continues to step 630.

At step 630, the optimal file is selected. If steps 604, 608, 612, 616, 620 and 624 do not distinguish the duplicate media files (e.g., the two duplicate media files are equal quality, same bit rate, same network connection, etc.), the optimal media file is randomly picked, in step 630. On the other hand, if there are distinguishing attributes between the two media files, the media file associated with more preferred attributes is selected, in step 630. The weight of each attribute is not necessarily equal. For example, the file quality may be more heavily weighted than bit rate, which may be weighted more heavily than proximity, and so on. Thus, a higher quality media file may be selected in step 630 even though the other media file has a lower bit rate and closer proximity. The metrics shown in FIG. 6 are for illustrative purposes only, and other metrics may be used to distinguish duplicate media files.

Figures 7, 8, 9:
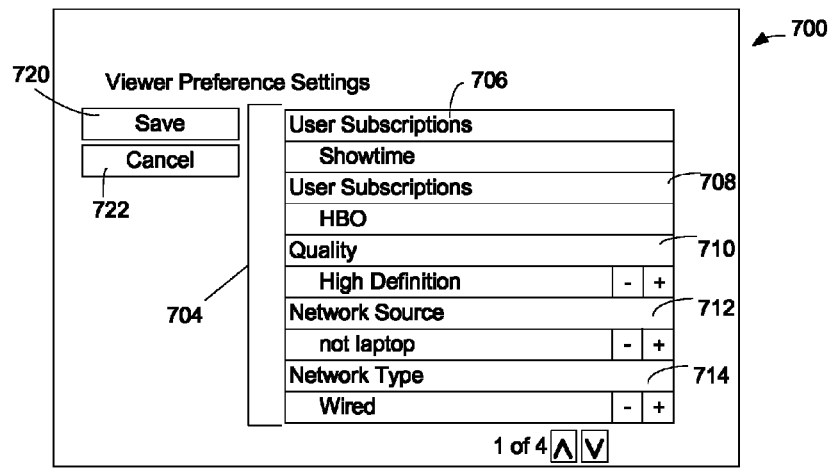
FIG. 7 depicts an exemplary user interface that allows a user to customize viewer preference settings.
FIG. 8 depicts an exemplary advertising revenue data table.
FIG. 9 depicts an exemplary theme data table.

FIG. 7 displays a user interface 700. The user interface 700 allows a user to designate preferred content providers and quality settings. User interface 700 illustrates various sample settings 704. The settings 704 are for illustration purposes only and may include other types of settings. In FIG. 7, the user interface 700 includes a first user subscription setting 706, a second user subscription setting 708, a quality setting 710, a network source setting 712, and a network type setting 714. As shown in FIG. 7, the user prefers to view content obtained from either Showtime or HBO. The user has also set the quality setting 710 to high definition, the network source setting 712 to not laptop and the network type setting 714 to wired. The user may save the settings 704 by choosing the save button 720.

FIGS. 8-9 illustrate exemplary data tables used for calculating the TR score. In particular, FIG. 8 provides an exemplary advertising revenue data table 800 whereby one or more content sources 802 are associated with an advertising revenue value 804. As shown in FIG. 8, the content provider HULU (806) is associated with the advertising value 10 (814), NBC (808) is associated with the advertising revenue value 9 (816), ABC (816) is associated with the advertising value 8 (818), and CBS (812) is associated with the advertising revenue value of 7 (820). The table 800 shown in FIG. 8 is not exhaustive. The table 800 indicates that content obtained from HULU generates the most advertising revenue, and therefore is associated with the highest advertising revenue value 804. In some instances, no advertising revenue will be associated with the media content. For example, sometimes media content will be obtained from certain third party content aggregators such as, but not limited to, YouTube. Or the DMA 108 may not be able to identify the content source provider/aggregator. In these cases, the ad revenue value would equal zero. The ad revenue value 804 may represent advertising revenue generated for one or more of the following: the content provider, the content aggregator or the service aggregator.

FIG. 9 shows an exemplary relevance value data table 900. The data table 900 lists themes matched (902) and a relevance value (904). To determine the relevance value (step 406), the DMA 108 first determines how many of the personal content themes are associated with the piece of content. The DMA 108 then refers to the themes matched column 902 in the table 900. If the piece of content contains all of the personal content themes except one, the DMA 108 retrieves a relevance value of 9 (816). If the piece of content contains all of the personal content themes except two, the DMA 108 retrieves a relevance value of 8 (818). If the piece of content contains all of the personal content themes except three, the DMA 108 retrieves a relevance value of 7 (820). The table 900 shown in FIG. 8 is not exhaustive. For example, the themes matched column 902 may comprise a range of how many themes are contained in the piece of content, or the personal content themes may be weighted such that relevance values are determined by the type of personal content theme.

Figure 10A:
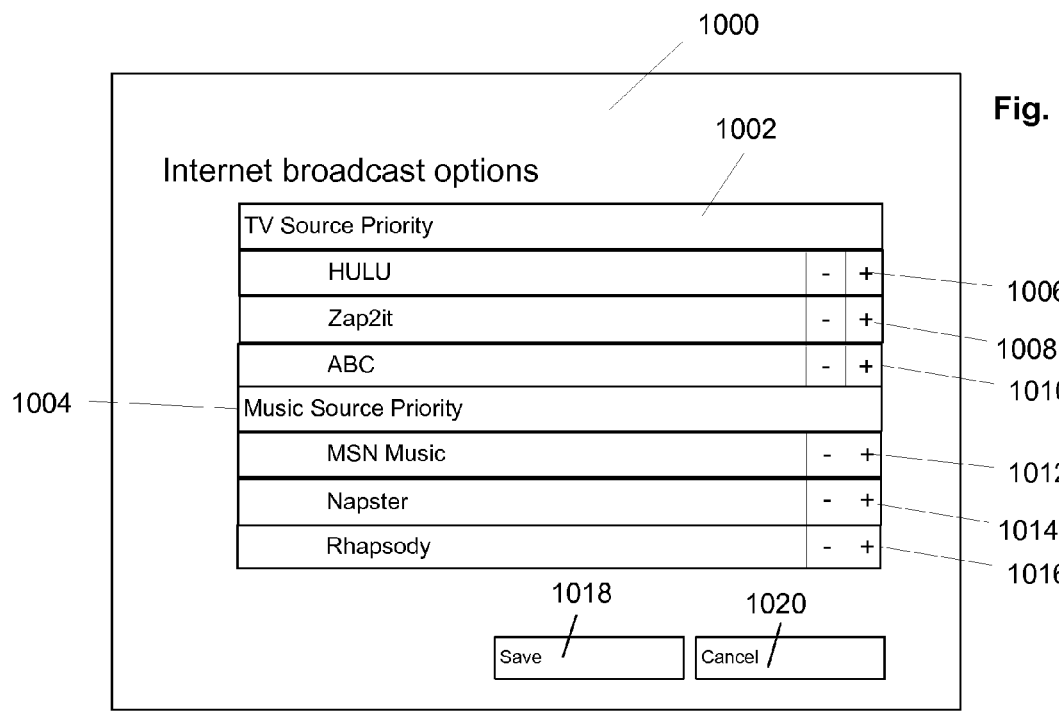
FIGS. 10A-10B each depict an exemplary user interface that allows a user to designate preferred remote content providers.
Figure 10B:
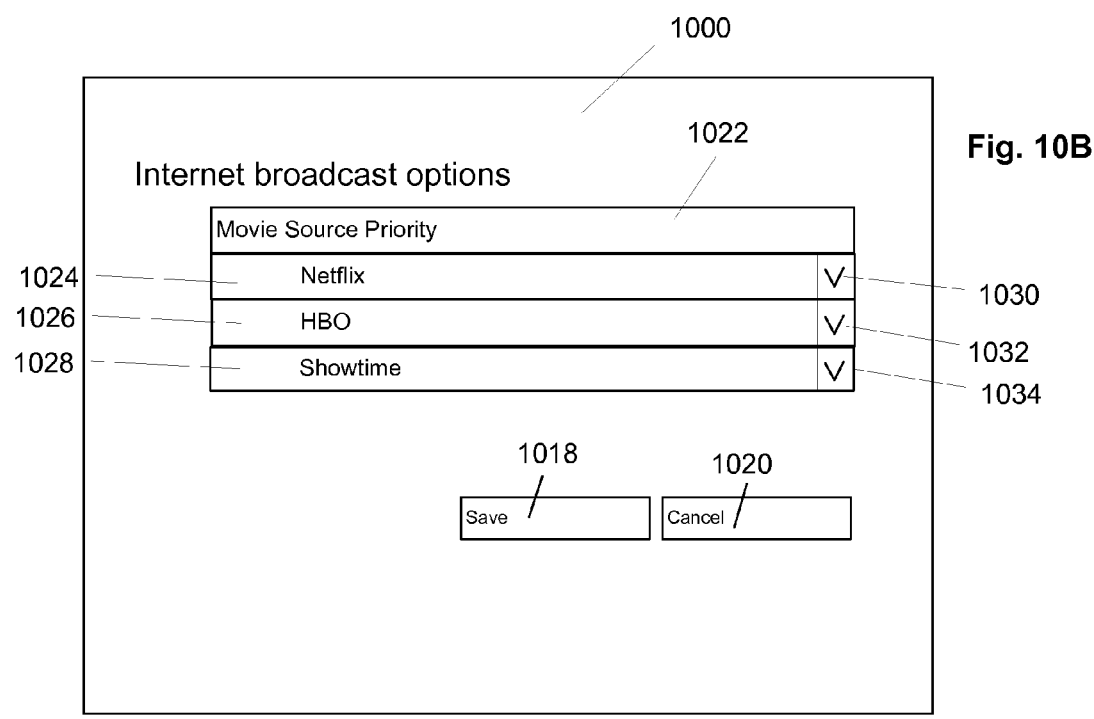

FIGS. 10A-10B each illustrates a user interface 1000 that allows a user to designate preferred content providers. In FIG. 10A, the user interface 1000 allows the user to designate preferred television content providers 902 and preferred music content providers 904. Using the example shown in FIG. 10A, the user has designated that television content should first be obtained from HULU. If the selected television episode is not available via HULU, the user has requested that ZAP2IT is searched next for the television episode. And if the television episode is not available on either HULU or ZAP2IT, the user has requested that the episode be obtained from ABC. If the television episode is not available on any of these three sites, the DMA 108 may search other content providers for the specific television episode. FIG. 9A also illustrates that MSN Music be searched first for music content, then Napster, and then Rhapsody. The DMA 108 may search other music content providers if the music content requested by the user cannot be located on any of these three sites. After the user has set the broadcast options in the user interface 1000, the user may save the preferences by selecting the save button 1018. FIG. 10B provides an example whereby the user may designate preferences for movie content providers 1022. In the example shown in FIG. 10B, the user has requested that Netflix be searched first, then HBO, and then Showtime for movie content requested by the user. The DMA 108 may search other movie content providers if the specific movie content cannot be obtained from any of the preferred providers.

Figure 11:
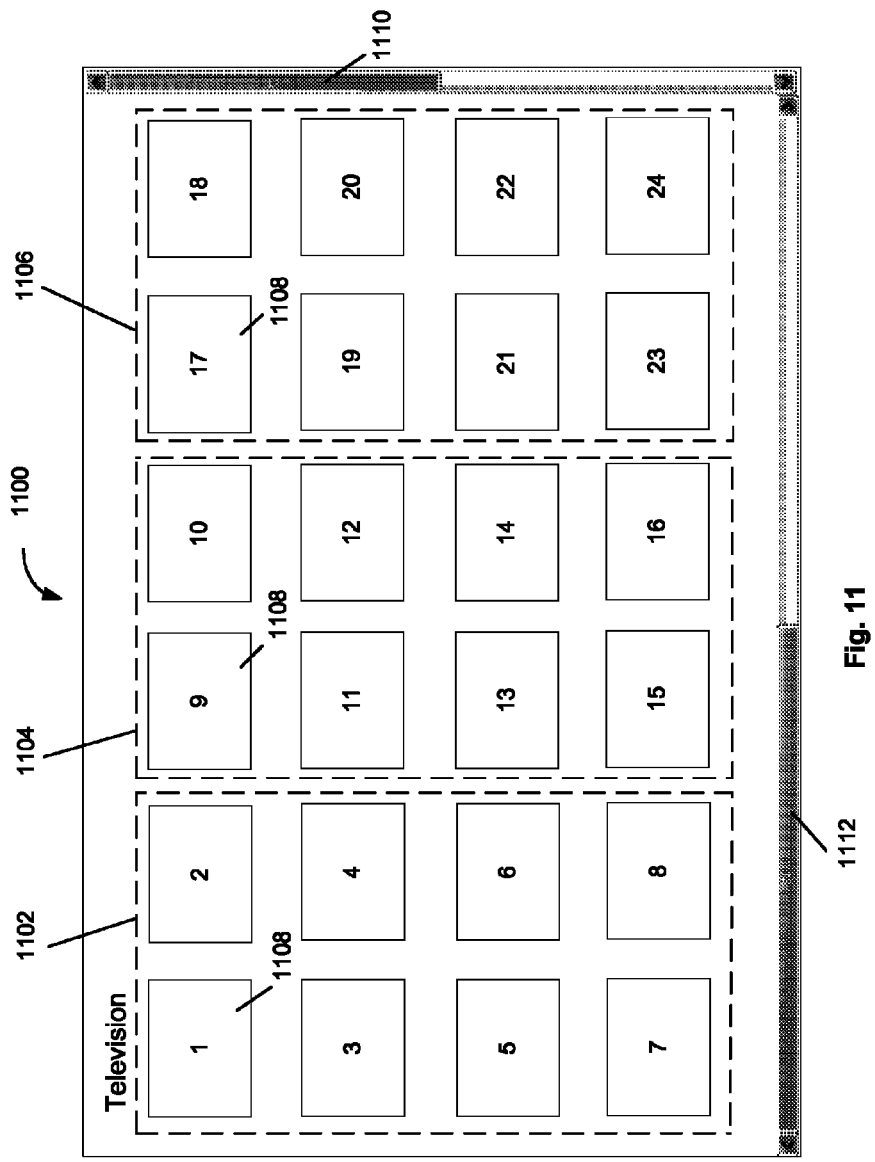
FIG. 11 depicts an exemplary user interface for displaying television episode thumbnail images in a gallery format.

FIG. 11 provides an example of a user interface 1100 for displaying television content in a gallery format. FIG. 11 illustrates that 24 tiles may be displayed in the user interface 1100 at one time. The number of tiles displayed in the user interface 1100 is for exemplary purposes only, and any number of tiles may be displayed in the user interface 1100. The user interface 1100 displays thumbnail images of the television episodes according to groups set in step 314: Group 1, Group 2 and Group 3. The Group 1 television episodes are displayed in section 1102 of the user interface 1100. The Group 2 television episodes are displayed in section 1104 of the user interface. The Group 3 television episodes are displayed in section 1106 of the user interface 1100. As discussed above, the Group 1 television episodes are the highly relevant episodes that will generate high advertising revenue, the Group 2 television episodes are the episodes with some relevance that also generate high advertising revenue, and the Group 3 television episodes are the highly relevant episodes that generate low advertising revenue.

Within each section of the user interface 1100, the thumbnail images are displayed in priority order from left to right. For example, within section 1102, the highest priority Group 1 episode is displayed in tile 1, the second high priority Group 1 episode is displayed in tile 2, the third highest priority Group 1 episode is displayed in tile 3, and so on. In section 1104, the highest priority Group 2 episode is displayed in tile 9, the second highest Group 2 episode is displayed in tile 10, the third highest priority Group 2 episode is displayed in tile 11, and so on. Within section 1106, the highest priority Group 3 episode is displayed in tile 17, the second highest priority Group 3 episode is displayed in tile 18, the third highest priority Group 3 episode is displayed in tile 19, and so on. It is within the scope of the technology to also display the thumbnail images in priority order from top to bottom. For example, the highest priority Group 1 episode would be displayed in tile 1, the second high priority Group 1 episode is displayed in tile 3, the third highest priority Group 1 episode is displayed in tile 5, and so on. The user interface 1100 includes a vertical scroll bar 1108 and a horizontal scroll bar 1110 so that the viewer can view additional tiles not currently visible in the viewing area of the user interface 1100.

The configuration of sections 1102-1106 are displayed in the user interface 1100 are not limited to that shown in FIG. 11. Users typically read text displayed on a screen from left to right. In FIG. 11, the Group 1 episodes, which should be of most interest to a user and generate the most advertising revenue, are displayed in the leftmost portion of the interface 1100. The placement of the Group 1 episodes encourages a user to select one of the thumbnails in the section 1102 of the interface 1100. The Group 2 episodes, which are less relevant but still generate high advertising revenue, are displayed in the center section 1104 of the interface. With this format, two-thirds of the interface 1100 displays high advertising revenue generating television episodes in an attempt to maximize the advertising revenue for the DMA provider. The sections 1102-1106 may be displayed in the interface 1100 in any order.

Figure 12:
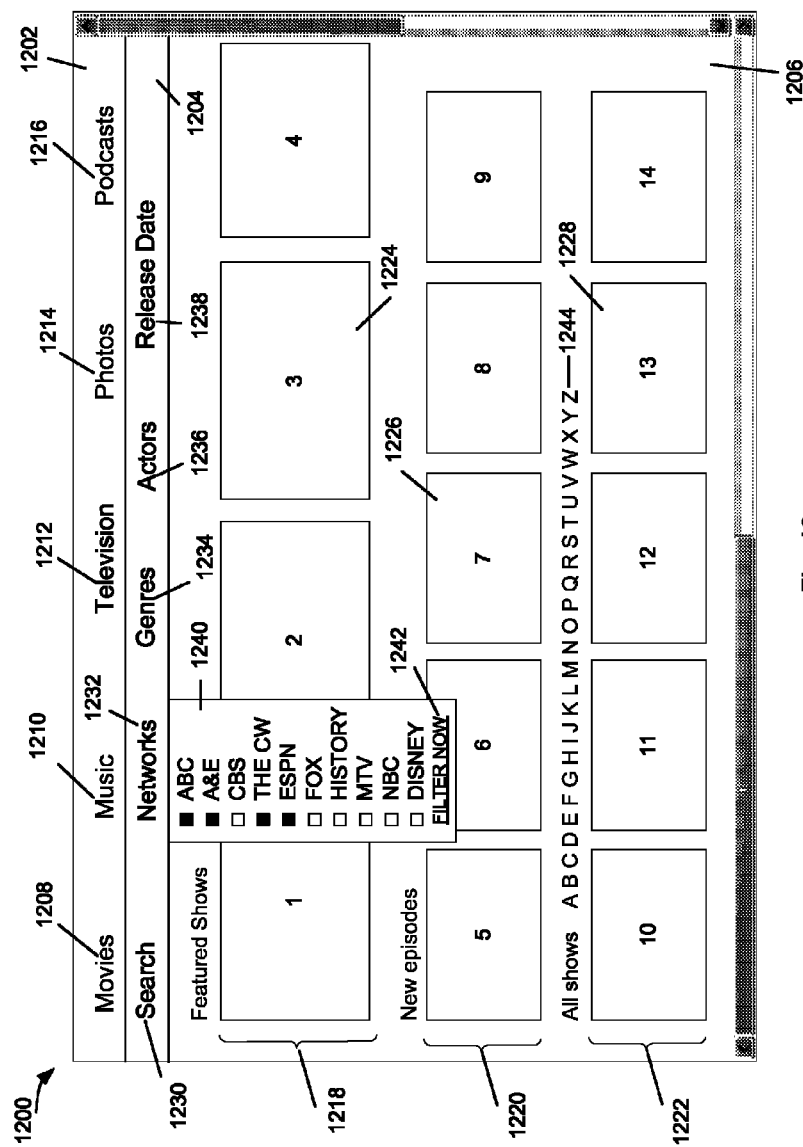
FIG. 12 depicts an exemplary user interface for displaying music thumbnail images in a gallery format.

FIG. 12 illustrates an exemplary user interface 1200. The user interface 1200 contains a content menu 1202, a filter menu 1204 and a display window 1206. The content menu 1202 provides the following selections: Movies 1208, Music 1210, Television 1212, Photos 1214 and Podcasts 1216. Other selections are within the scope of the technology described herein. As shown in FIG. 12, a user has selected Television 1212 in the content menu 1202. By selecting Television 1212, the display window 1206 displays three different categories of television content: Featured Shows 1218, New episodes 1220 and All shows 1222. In one embodiment, the Featured Shows 1218 comprise television content that is highly relevant to the user's personal content settings and produces high revenue for the DMA supplier (e.g., high total relevance score). Other criteria may be used to designate television content as a Featured Show. As shown in FIG. 12, a thumbnail image 1224 displayed in the window 1206 for each Featured Show is larger than a thumbnail image 1226 displayed for television content displayed under New episode or a thumbnail image 1228 displayed under All shows. This is done to encourage the user to select one of the thumbnail images 1224 displayed under Featured Shows; however, it is not a required feature. In one embodiment, the display window 1206 only displays thumbnail images of content identified on the WAN 114. In another embodiment, the display window 1206 displays both content identified on the WAN 114 and local content identified on the user's home network 100.

FIG. 12 illustrates that the filter menu 1204 provides the following selections: Search 1230, Networks 1232, Genres 1234, Actors 1236 and Release Date 1238. Each of these settings allows a user to narrow the television content choices. FIG. 12 illustrates that selecting one of the filter menu options, such as Networks 1232, generates a drop-down menu 1240 providing the user with addition choices. For example, selecting the Networks option 1232, a drop-down menu 1240 appears displaying the various networks associated with the television content displayed in the window 1206. In the FIG. 12 embodiment, the networks shown in drop-down menu 1240 include ABC, A&E, CBS, THE CW, ESPN, FOX and so on. A user may select any one of these networks (or more than one) in the drop-down menu 1240. By doing so, the thumbnail images displayed in the window 1206 will be limited to the network(s) selected in the drop-down menu 1240. For example, FIG. 12 illustrates that a user has selected ABC, A&E, the CW and ESPN in the drop-down menu 1240. By selecting the "filter now" button 1242 in the drop-down menu 1240, the only thumbnail images displayed in a refreshed window 1206 will be thumbnail images of television programs and/or episodes broadcast on ABC, A&E, THE CW and ESPN.

The other options provided in the filter menu 1204 allow a user to narrow the television content choices displayed in the window 1206 in a similar manner. For example, the Genres option 1234 in the filter menu 1204 may allow a user to chose which genres of television content (e.g., reality television, news, etc.) to display in the window 1206. The Actors option 1236 in the filter menu 1204 may allow a user to choose to display only thumbnail images of television programs that have a specific actor or actress in the program. Similar to the Networks option 1232, a user may select more than one actor or actress at a time in the Genres drop-down menu (not shown).

The New episodes section 1220 of the window 1206 displays thumbnail images 1226 of television programs that have had a new episode since the last time the user watched television. The All shows section 1222 of the window 1206 displays a portion of all the thumbnail images identified on the WAN that match one or more of the user's personal content themes. In the FIG. 12 embodiment, the All shows section 1222 of the window is organized in an index 1244 by letter.

Figure 13:
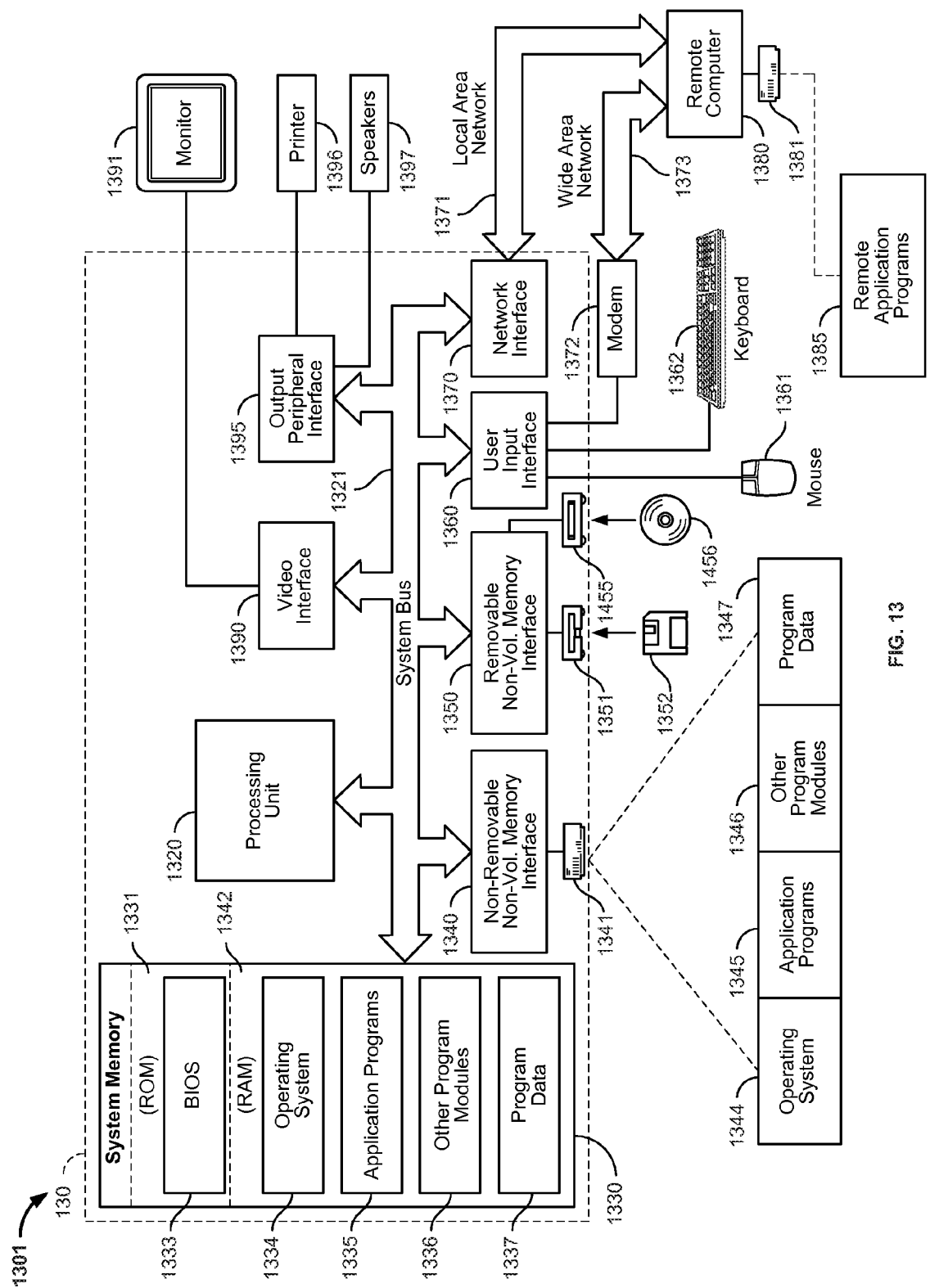
FIG. 13 depicts a schematic diagram of a computer for performing each of the methods described herein.

FIG. 13 illustrates an example of a suitable general computing system environment 1301 for generating a recording schedule. It is understood that the term "processing device" as used herein broadly applies to any digital or computing device or system. The computing system environment 1301 is only one example of a suitable computing environment and is not intended to suggest any limitation as to the scope of use or functionality of the inventive system. Neither should the computing system environment 1301 be interpreted as having any dependency or requirement relating to any one or combination of components illustrated in the exemplary computing system environment 1301.

With reference to FIG. 13, an exemplary system for implementing the inventive system includes a general purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1310 may include a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 210. Communication media typically embodies computer readable instructions, data structures, program modules or other data in a modulated data signal. By way of example, and not limitation, communication media includes wired media such as a wired network or direct-wired connection, and wireless media such as RF and other wireless media. Combinations of any of the above are also included within the scope of computer readable media.

The system memory 1330 includes computer storage media in the form of volatile and/or nonvolatile memory such as ROM 1331 and RAM 1332. A basic input/output system (BIOS) 1333, containing the basic routines that help to transfer information between elements within computer 210, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable, volatile/nonvolatile computer storage media. By way of example only, FIG. 13 illustrates a hard disc drive 1341 that reads from or writes to non-removable, nonvolatile magnetic media and a magnetic disc drive 1351 that reads from or writes to a removable, nonvolatile magnetic disc 1352. Computer 1310 may further include an optical media reading device 1355 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1341 is typically connected to the system bus 1321 through a non-removable memory interface such as interface 1340. Magnetic disc drive 1351 and optical media reading device 1355 are typically connected to the system bus 1321 by a removable memory interface, such as interface 1350.

The drives and their associated computer storage media discussed above and illustrated in FIG. 13, provide storage of computer readable instructions, data structures, program modules and other data for the computer 1310. In FIG. 13, for example, hard disc drive 1341 is illustrated as storing operating system 1344, application programs 1345, other program modules 1346, and program data 1347. These components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies.

A user may enter commands and information into the computer 1310 through input devices such as a keyboard 1362 and a pointing device 1361, commonly referred to as a mouse, trackball or touch pad. Other input devices (not shown) may include a microphone, joystick, game pad, satellite dish, scanner, or the like. These and other input devices are often connected to the processing unit 1320 through a user input interface 1360 that is coupled to the system bus 1321, but may be connected by other interface and bus structures, such as a parallel port, game port or a universal serial bus (USB). A monitor 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include a local window network (LAN) 1371 and a wide window network (WAN) 273, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communication over the WAN 1373, such as the Internet. The modem 1372, which may be internal or external, may be connected to the system bus 1321 via the user input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for displaying content, comprising the steps of:
   (a) receiving a request from a user to view media content;
   (b) identifying media files stored on a local network associated with the user;
   (c) determining personal content themes based on the media files identified in step (b), the personal content themes indicating one or more habits associated with the user;
   (d) identifying media files on a remote network that match at least one of the personal content themes determined in step (c);
   (e) calculating a total relevance value for each media file identified in step (d) based on a weighted calculation including a theme value associated with the media file and a revenue value associated with the media file, the total relevance value calculated for each media file identified in step (d) representing a degree of relevance to the one or more habits associated with the user;

(f) prioritizing the media files based on the total relevance value calculated in step (e);

(g) generating a thumbnail image associated with each media file, and (h) displaying the thumbnail image associated with each media file to the user on a monitor based on step (f) of prioritizing the media files;

wherein the total relevance value for each media file is calculated according to (a first coefficient×the determined theme value)+(a second coefficient×the determined revenue value); and wherein the first coefficient and the second coefficient may be adjusted dynamically based on user behavior.

2. The method as recited in claim 1, wherein step (e) of calculating the total relevance value for each media file comprises the steps of:

(i) determining the theme value based on the number of the one or more personal content themes contained in the media file;

(ii) determining the revenue value based on advertising revenue associated with the media file;

(iii) calculating a total relevance value for each media file based on step (e)(i) of determining the theme value and step (e)(ii) of determining the revenue value.

3. The method as recited in claim 2, wherein step (e)(i) of determining the theme value further comprises the steps of:

identifying the one or more personal content themes contained in the media file; and determining a theme value based on the number of the one or more personal content themes contained in the media file.

4. The method as recited in claim 2, wherein step (f) of prioritizing the media files comprises the steps of:

organizing the media files by total relevance value; and partitioning the media files organized by total relevance value into groups of media files, wherein each group of media files is defined by a predefined range of total relevance values.

5. The method as recited in claim 4, wherein step (h) of displaying the thumbnail image associated with each media file comprises the steps of:

providing a user interface to the user; and displaying thumbnail images associated with the media files via the user interface by group.

6. The method as recited in claim 5, wherein said step (h) of displaying the thumbnail images comprises the steps of:

for each group of media files, determining the number of media files to display in the user interface; and displaying the groups of media files in the user interface based on determining the number of media files to display.

7. The method as recited in claim 2, wherein step (e) of calculating the total relevance value for each media file includes calculating the total relevance value based on a weighted sum calculation including the determined theme value and revenue value.

8. The method as recited in claim 1, wherein step (d) of identifying media files on a remote network comprises the step of:

identifying media files stored on third party content sites.

9. The method as recited in claim 1, wherein step (d) of identifying media files on a remote network comprises the steps of:

determining whether the user designated any preferred third party content sources located on the remote network;

searching first for media files located on the remote network in any designated preferred content sources; and searching second for media files located on the remote network in other content sources.

10. The method as recited in claim 1, wherein step (c) of determining personal content themes comprises the steps of:

for each media file identified in step (b), obtaining meta data associated with the media file; and identifying at least one personal content theme based on the obtained meta data.

11. One or more processor readable storage devices storing processor readable code embodied on said processor readable storage devices, said processor readable code for programming one or more processors to perform a method comprising:

(a) receiving a request from a user to view a type of media content;

(b) determining personal content themes associated with the user, the personal content themes indicating one or more habits associated with the user;

(c) identifying media files on a remote network, wherein the media files are associated with the type of content requested by the user and contain at least one of the personal content themes determined in step (b);

(d) calculating a total relevance value for each media file identified in step (c) based on a weighted calculation including a theme value associated with the media file and a revenue value associated with the media file, the total relevance value calculated for each media file identified in step (c) representing a degree of relevance of each media file to the one or more habits associated with the user; and (e) displaying a thumbnail image in an interface for each media file identified in step (c) based on the total relevance value calculated in step (d) for each media file;

wherein the total relevance value for each media file is calculated according to (a first coefficient×the determined theme value)+(a second coefficient×the determined revenue value); and wherein the first coefficient and the second coefficient may be adjusted dynamically based on user behavior.

12. One or more processor readable storage devices as recited in claim 11, wherein step (b) of determining personal content themes comprises the steps of:

searching the user's home network for media files associated with the type of content requested by the user;

identifying previously selected media files that were located on the remote network and are associated with the type of content requested by the user;

obtaining meta data associated with each media file identified in the search of the user's home network;

obtaining meta data associated with the previously selected media files; and determining personal content themes based on the meta data obtained from the media files located in the user's home network and the meta data from the previously selected media files.

13. One or more processor readable storage devices as recited in claim 11, wherein step (d) of calculating the total relevance value for each media file identified on the remote network comprises the steps of:

determining the theme value for the media file based on the number of personal content themes contained in the meta data of the media file;

determining the revenue value for the media file based on advertising revenue associated with the media file;

calculating the total relevance value based on a weighted sum calculation including the determined theme value and revenue value.

14. One or more processor readable storage devices as recited in claim 11, wherein step (c) of identifying media files on a remote network comprises the steps of:

identifying a media file associated with the type of content requested by the user;

obtaining meta data contained in the media file; and determining whether the meta data obtained from media file matches any of the personal content themes determined in step (b).

15. A method for displaying content, comprising the steps of:

(a) receiving a request from a user to view media content;

(b) identifying media files stored on a local network associated with the user;

(c) determining one or more personal content themes based on meta data associated with the media files identified in step (b), the one or more personal content themes indicating one or more viewing habits associated with the user;

(d) identifying media files on a remote network that match at least one of the personal content themes determined in step (c);

(e) calculating a total relevance value for each media file identified in step (d) based on a weighted calculation including a theme value associated with the media file and a revenue value associated with the media file, the total relevance value calculated for each media file identified in step (d) representing a degree of relevance of the media file to the one or more habits associated with the user;

(f) prioritizing the media files based on the total relevance value calculated in step (e), wherein prioritizing the media files includes organizing the media files by total relevance value and partitioning the media files organized by total relevance value into groups of media files, wherein each group of media files is defined by a predefined range of total relevance values;

(g) generating a thumbnail image associated with each media file identified in step (d), and (h) displaying the thumbnail image associated with each media file identified in step (d) to the user on a monitor based on step (f) of prioritizing the media files;

wherein the total relevance value for each media file is calculated according to (a first coefficient×the determined theme value)+(a second coefficient×the determined revenue value); and wherein the first coefficient and the second coefficient may be adjusted dynamically based on user behavior.

* * * * *